United States Patent
Daoud

(10) Patent No.: US 6,307,999 B1
(45) Date of Patent: Oct. 23, 2001

(54) FIBER-OPTIC CABLE ROUTING AND SEPARATING DEVICE

(75) Inventor: Bassel Hage Daoud, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/391,019

(22) Filed: Sep. 7, 1999

(51) Int. Cl.⁷ .................................................. G02B 6/00
(52) U.S. Cl. ......................... 385/135; 385/134; 385/137
(58) Field of Search .................................. 385/134, 135, 385/136, 137, 147

(56) References Cited

U.S. PATENT DOCUMENTS 5,241,617 * 8/1993 Peacock et al. ..................... 385/135
5,946,440 * 8/1999 Puetz .................................... 385/135
5,987,207 * 11/1999 Hoke .................................... 385/135

* cited by examiner

Primary Examiner—Loha Ben
(74) Attorney, Agent, or Firm—Stroock & Stroock & Lavan LLP

(57) ABSTRACT

A fiber-optic cable routing and separating device that includes a plurality tiered cable routers disposed in vertically and horizontally spaced apart relation to each other. Each cable router defines a cable routing path that can accommodate a different fiber-optic cable length and that further limits the bend radius of the routed fiber cable. The plurality of tiered cable routers also provides the ability to separate individual or groups of fiber-optic cables.

23 Claims, 3 Drawing Sheets

FIBER-OPTIC CABLE ROUTING AND SEPARATING DEVICE

FIELD OF THE INVENTION

The present invention relates to fiber-optic cable routers and guides and, more particularly, to a fiber-optic cable routing and separating device comprised of a plurality of tiered cable routers that provide for separation and routing of one or a plurality of fiber-optic cables.

BACKGROUND OF THE INVENTION

When installing fiber-optic cables, it is necessary to separate individual and groups of cables so that the cables may be later identified for connection, service, etc. It is also desirable to provide slack in the installed cables so that if it becomes necessary to splice a cable, there is enough cable to facilitate the splice. It is also desirable to limit the bend radius of fiber-optic cables to prevent damage or breakage of the cables, and to ensure that routed fiber-optic cables do not encumber access to other connector, components, etc. provided in a fiber-optic cable enclosure.

There thus exists a need in the art for a fiber-optic routing and separating device that separates a plurality of cables, provides the ability to group fiber cables, limits the bend radius of routed cables, and does not impeded access to other components within the cable enclosure.

SUMMARY OF THE INVENTION

The present invention is directed to a fiber-optic cable routing and separating device that includes a plurality tiered cable routers disposed in vertically and horizontally spaced apart relation to each other. Each cable router defines a cable routing path that can accommodate a different fiber-optic cable length and that also limits the bend radius of the routed fiber cable. The plurality of tiered cable routers also provides the ability to separate individual or groups of fiber-optic cables.

In a first embodiment of the present invention, a fiber-optic cable routing and separating device comprises a base having a plurality of tiered fiber-optic cable routers connected thereto. Each of the tiered routers defines a fiber-optic cable routing paths over which one or a plurality of fiber-optic cables may be routed and which limits bending of the fiber-optic cable to less than a predetermined amount.

In a second embodiment of the present invention, a fiber-optic cable routing and separating device comprises a first generally arcuate routing surface in communication with a plurality of tiered generally arcuate routing surfaces defining a plurality of fiber-optic cable routing paths of different lengths.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein like reference characters denote similar elements throughout the several views.

DETAILED DESCRIPTION OF THE PRESENTLY PREFERRED EMBODIMENTS

The present invention is directed to a fiber-optic cable routing and separating device that includes a plurality tiered cable routers disposed in vertically and horizontally spaced apart relation to each other. Each cable router defines a cable routing path that can accommodate a different fiber-optic cable length and that also limits the bend radius of the routed fiber cable. The plurality of tiered cable routers also provides the ability to separate individual or groups of fiber-optic cables.

Figure 1:
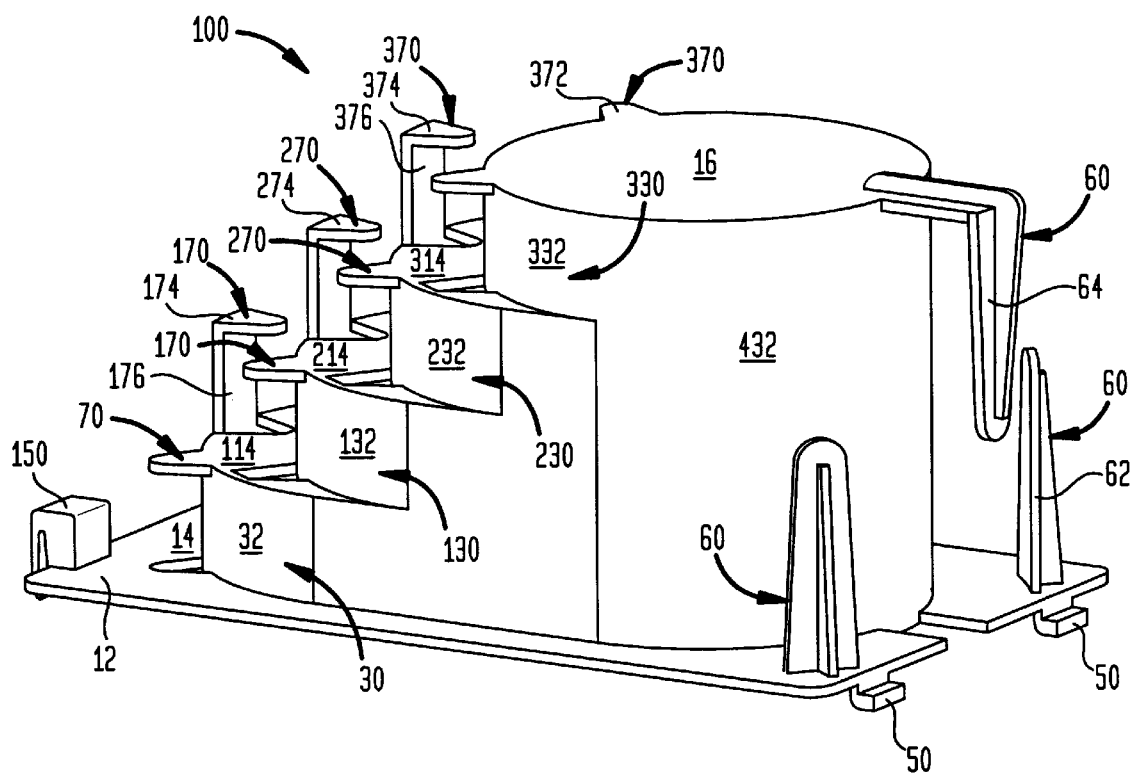
FIG. 1 is a right-side perspective view of a fiber-optic cable routing and separating device constructed in accordance with the present invention.
Figure 2:
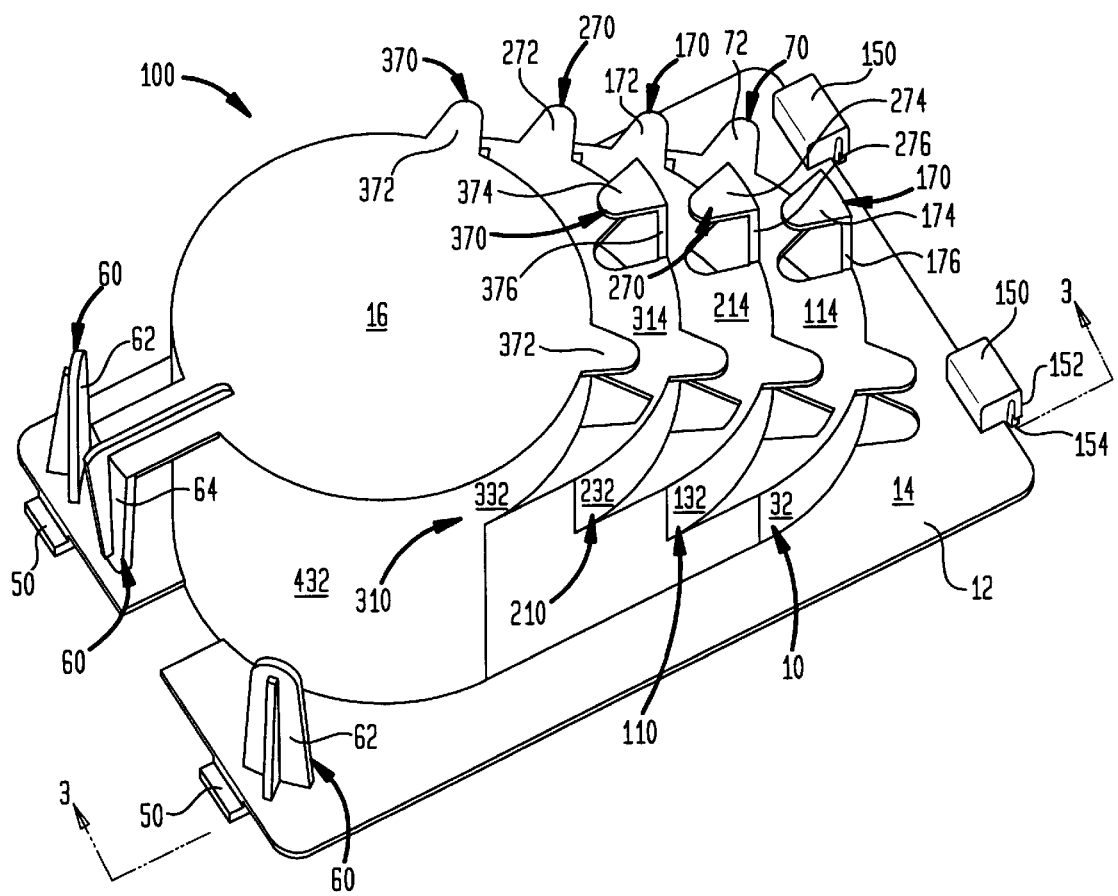
FIG. 2 is a top left-side perspective view of the fiber-optic cable routing and separating device of FIG. 1.

Referring now to the drawings in detail, FIGS. 1 and 2 depict a preferred embodiment of a fiber-optic cable routing and separating device 100 constructed in accordance with the present invention. The device 100 includes a base 12 and a plurality of tiered cable routers 10, 110, 210, 310 that are all connected to the base 12. In a preferred embodiment, the base 12 and plurality of routers 10, 110, 210, 310 form a unitary structure. However, the present invention also contemplates separate base and router components. Each router includes a generally vertical routing surface 32, 132, 232, 332 that separately define a generally arcuate part of a plurality of fiber-optic cable routing paths 30, 130, 230, 330. The tiered arrangement of the routers 10, 110, 210, 310 provides routing paths 30, 130, 230, 330 that can accommodate different length fiber-optic cables (not shown). The base 12 has a top surface 14 that also serves as a generally horizontal routing surface for the lower-most router 10. The remaining routers 110, 210, 310 also include generally horizontal routing surfaces 114, 214, 314 that are parallel with surface 14 and vertically spaced apart therefrom and from each other. Thus, the routing paths 30, 130, 230, 330 are also defined by the vertically spaced-apart horizontal routing surfaces 14, 114, 214, 314.

Each router 10, 110, 210, 310 includes a plurality of guides 70, 170, 270, 370 to prevent movement of the fiber-optic cable off of a respective one of said cable routing paths 30, 130, 230, 330. The guides preferably comprise two tabs 72, 172, 272, 372 that extend generally perpendicularly from the vertical routing surface 32, 132, 232, 332 and that have a top surface that is generally co-planar with the horizontal routing surface of the next highest router. For example, the top surface of the tabs 72 of the lower-most router 10 are generally co-planar with the horizontal routing surface 114 of the adjacent (but next-highest) router 110. With the exception of the lower-most router 10, the guides 170, 270, 370 also comprise a tab 174, 274, 374 disposed on a standoff 176, 276, 376 that extends generally upward from the horizontal routing surface 114, 214, 314. The tabs 174, 274, 374 include a top surface that is substantially co-planar with the horizontal routing surface of the adjacent and next-highest router, as described above. Together, the guides 70, 170, 270, 370 of the various routers 10, 110, 210, 310 prevent movement of the fiber-optic cable off of the respective cable routing path 30, 130, 230, 330 and also serve to define the boundaries of a part of that routing path 30, 130, 230, 330.

A retainer 60 is also provided as part of the inventive cable routing and separation device 100 to further facilitate routing of one or a plurality of fiber-optic cables. The retainer 60 includes two first retainer parts 62 that extend generally upward from the base 12 and that comprise a generally vertical wall. The retainer 60 also comprises a second retainer part 64 that extends generally downward from a top surface 16 from the upper-most cable router 310. The retainer 60 secures one or more fiber-optic cables in place on the device 100 and, together with a generally vertical routing surface 432 that spans the height of all of the individual routers 10, 110, 210, 310, serves to define a part of the respective cable routing paths 30, 130, 230, 330.

Figure 3:
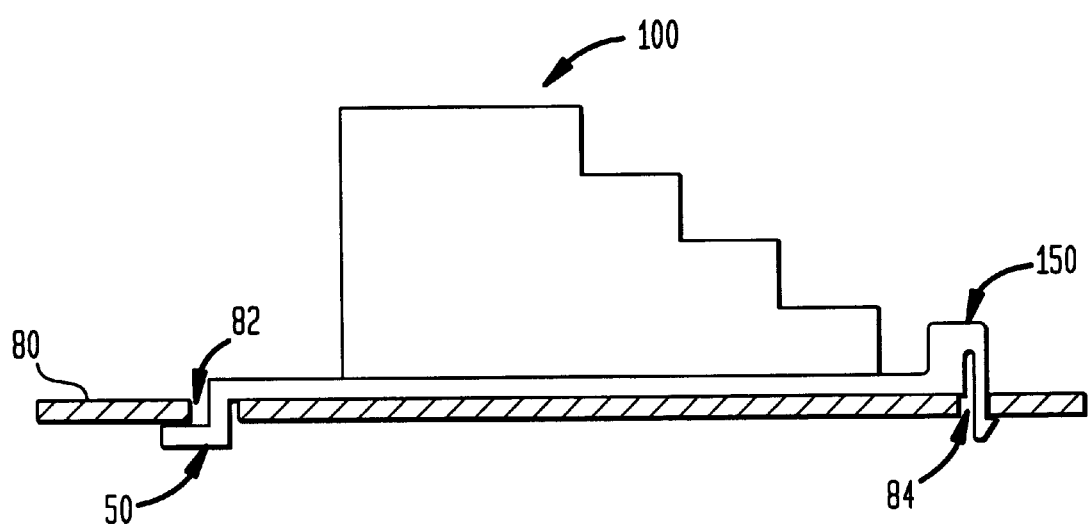
FIG. 3 is a cross-sectional view of a routing and separating device taken along the line 3—3 of FIG. 2 and depicting a panel to which the device may be removably affixed.

Referring next to FIG. 3, the routing and separating device 100 of the present invention includes non-movable mounts 50 and selectively deflectable mounts 150 for removably securing the device 100 to a panel 80 that may be provided as part of a fiber-optic cable enclosure (not shown). For ease of discussion and for clarity, certain details of the inventive device 100 have been omitted from FIG. 3. The non-movable mounts 50 are sized and shaped for insertion into a generally rectangular opening 82 defined in the panel 80. The deflectable mounts 150 include a flexible arm 152 having a lock 154 disposed on a free end thereof. The arm 152 may be deflected as the mount 150 is inserted into an opening 84 defined in the panel 80. The lock 154 releasably secures the device 100 in place by providing an interference fit with the panel 80.

The routing and separating device 100 of the present invention provides a plurality of spatially distinct cable routing paths 30, 130, 230, 330, that prohibit bending of the cable beyond a predetermined bending limit. Preferably, each path limits the bend radius of the routed fiber-optic cable to no less than approximately 1½ inch, although the specific bend radius limitation is an application specific matter of design choice. Additionally, the path of the cable need not be semi-circular, but may be generally arcuate, ovoid, parabolic or other shape that prevents bending of the cable beyond a predetermined amount that, if exceeded, would affect the integrity of the cable. Each routing path 30, 130, 230, 330 also provides a different routing length for an individual or a group of fiber-optic cables. It is thus possible, with the device of the present invention, to separate fiber-optic cables during routing for later identification or to facilitate interconnection, splicing, etc. of the cables. For example, if the inventive device 100 is employed as part of a fiber-optic cable management system for an apartment building, the cables for different floors may be routed over different routing paths. The inventive device 100 thus provides separation of the fiber-optic cables and ensures that sufficient slack is provided in the routed cable to facilitate subsequent interconnection, splicing, and the like. Moreover, the generally arcuate part of the routing path 30, 130, 230, 330 defined by the generally vertical surface 32, 132, 232, 332 limits the bend radius of the routed fiber-optic cable to approximately 1½ inch.

The tiered relationship between and among the plurality of cable routers 10, 110, 210, 310 also reduces the footprint of a device that provides the functionality of the inventive routing and separating device 100.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A fiber-optic cable routing and separating device comprising:
    a base; and
    a plurality of tiered fiber-optic cable routers connected to said base, each router defining a different fiber-optic cable routing path over which a fiber-optic cable may be routed, each router defining a generally arcuate part of a respective one of said plurality of different routing paths, said generally arcuate part being so sized and shaped as to inhibit bending of the fiber-optic cable beyond a predetermined bend amount.

2. A fiber-optic cable routing and separating device as recited by claim 1, further comprising
    a mount provided on said base for securing said routing and separating device to a mounting surface; and
    a guide for each of said tiered routers for preventing movement of the fiber-optic cable off of a respective one of said cable routing paths.

3. A fiber-optic cable routing and separating device as recited by claim 2, wherein said base has a top surface and wherein each of said routers includes a generally horizontal routing surface, said top surface of said base and said generally horizontal routing surfaces of said routers being vertically spaced apart from each other.

4. A fiber-optic cable routing and separating device as recited by claim 3, wherein each said router further comprises a generally vertical routing surface extending generally vertically upward with respect to said base and wherein each said guide comprises a tab that extends generally perpendicularly from said respective vertical routing surface and in vertically spaced apart relation to said respective horizontal routing surface.

5. A fiber-optic cable routing and separating device as recited by claim 2, wherein said device is adapted for use on a mounting panel and wherein said mount comprises:
    a non-movable mount that is sized and shaped for insertion into an opening defined in the panel; and
    a selectively deflectable mount that is sized and shaped for insertion into an opening defined in the panel for releasably securing the device in place on the panel.

6. A fiber-optic cable routing and separating device as recited by claim 5, wherein said selectively deflectable mount comprises a flexible arm having a lock disposed on a free end thereof for providing an interference fit with the panel.

7. A fiber-optic cable routing and separating device as recited by claim 1, wherein each said router further comprises a generally vertical routing surface extending generally vertically upward with respect to said base and which defines a generally arcuate part of a respective one of said plurality of routing paths.

8. A fiber-optic cable routing and separating device as recited by claim 1, further comprising a retainer for all of said tiered routers for preventing movement of one or a plurality of fiber-optic cables off of said routing and separating device.

9. A fiber-optic cable routing and separating device as recited by claim 8, wherein said retainer comprises two first retainer parts that extend in a first direction and a second retainer part that extends in a second direction that is generally opposite of said first direction.

10. A fiber-optic cable routing and separating device as recited by claim 9, wherein an uppermost one of said plurality of cable routers has a top surface and wherein said two first retainer parts extend in a direction generally upward from said base and said second retainer part extends in a direction generally downward from said top surface of said uppermost cable router.

11. A fiber-optic cable routing and separating device as recited by claim 1, wherein said plurality of tiered fiber-optic cable routers are vertically and horizontally spaced apart from each other.

12. A fiber-optic cable routing and separating device as recited by claim 1, wherein said plurality of fiber-optic cable routing paths are adapted to route a plurality of fiber-optic cables having different lengths.

13. A fiber-optic cable routing and separating device as recited by claim 1, wherein said base and said plurality of tiered routers comprise a unitary structure.

14. A fiber-optic cable routing and separating device comprising a first generally arcuate routing surface in communication with a plurality of tiered generally arcuate routing surfaces defining a plurality of fiber-optic cable routing paths of different lengths.

15. A fiber-optic cable routing and separating device as recited by claim 14, wherein said plurality of tiered generally arcuate routing surfaces are vertically and horizontally spaced apart from each other.

16. A fiber-optic cable routing and separating device comprising:
   a base;
   a plurality of tiered fiber-optic cable routers connected to said base, each router defining a fiber-optic cable routing path over which a fiber-optic cable may be routed, each router defining a generally arcuate part of a respective one of said plurality of routing paths, said generally arcuate part being so sized and shaped as to inhibit bending of the fiber-optic cable beyond a pre-determined bend amount; and
   a retainer for all of said tiered routers for preventing movement of one or a plurality of fiber-optic cables off of said routing and separating device, said retainer comprising two first retainer parts that extend in a first direction and a second retainer part that extends in a second direction that is generally opposite of said first direction.

17. A fiber-optic cable routing and separating device as recited by claim 16, wherein an uppermost one of said plurality of cable routers has a top surface and wherein said two first retainer parts extend in a direction generally upward from said base and said second retainer part extends in a direction generally downward from said top surface of said uppermost cable router.

18. A fiber-optic cable routing and separating device as recited by claim 16, wherein said plurality of tiered fiber-optic cable routers are vertically and horizontally spaced apart from each other.

19. A fiber-optic cable routing and separating device as recited by claim 16, wherein said base has a top surface and wherein each of said routers includes a generally horizontal routing surface, said top surface of said base and said generally horizontal routing surfaces of said routers being vertically spaced apart from each other.

20. A fiber-optic cable routing and separating device as recited by claim 19, wherein each said router further comprises a generally vertical routing surface extending generally vertically upward with respect to said base and wherein each said guide comprises a tab that extends generally perpendicularly from said respective vertical routing surface and in vertically spaced apart relation to said respective horizontal routing surface.

21. A fiber-optic cable routing and separating device comprising:
   a base; and
   a plurality of tiered fiber-optic cable routers connected to said base, each router defining a fiber-optic cable routing path over which a fiber-optic cable may be routed, each router defining a generally arcuate part of a respective one of said plurality of routing paths, said generally arcuate part being so sized and shaped as to inhibit bending of the fiber-optic cable beyond a pre-determined bend amount;
   wherein said base and said plurality of tiered routers comprise a unitary structure.

22. A fiber-optic cable routing and separating device as recited by claim 21, wherein said device is adapted for use on a mounting panel and wherein said mounting panel comprises:
   a non-movable mount that is sized and shaped for insertion into an opening defined in the panel; and
   a selectively deflectable mount that is sized and shaped for insertion into an opening defined in the panel for releasably securing the device in place on the panel.

23. A fiber-optic cable routing and separating device as recited by claim 22, wherein said selectively deflectable mount comprises a flexible arm having a lock disposed on a free end thereof for providing an interference fit with the panel.

* * * * *